United States Patent Office 3,520,893
Patented July 21, 1970

3,520,893
3-(γ-AMINO-β-HYDROXYPROPYL)-4-METHYL-7-ALKOXYCARBONYLALKOXY COUMARINS
Rudi Beyerle, Bruchkobel, Kreis Hanau, Rolf-Eberhard Nitz, Frankfurt am Main-Fechenheim, Heinrich Ritter, Dornigheim, Kreis Hanau, and Hanswilli von Brachel, Offenbach am Main, Germany, assignors to Cassella Farbwerke Mainkur Aktiengesellschaft, Frankfurt am Main-Fechenheim, Germany
No Drawing. Continuation-in-part of application Ser. No. 496,167, Oct. 4, 1965. This application Sept. 3, 1968, Ser. No. 757,098
Claims priority, application Germany, Oct. 17, 1964, C 34,135
Int. Cl. C07d 29/20
U.S. Cl. 260—294.3          6 Claims

ABSTRACT OF THE DISCLOSURE

The present invention relates to therapeutically valuable 3 - (γ - amino - β - hydroxypropyl)-4-methyl-7-hydroxycoumarin derivatives represented by the structural formula:

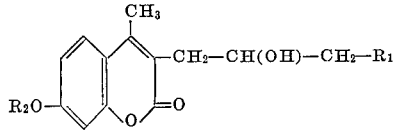

wherein $R_1$ is a member selected from the group consisting of alkylamino radicals having 2–6 carbon atoms, alkoxyalkylamino radicals having 1–4 carbon atoms in the alkoxy and 3–4 carbon atoms in the alkyl group, dialkylamino radicals having 1–4 carbon atoms, allylamino, cyclohexylamino, piperidino, and morpholino; and $R_2$ is a member selected from the group consisting of alkoxycarbonylalkyl radicals having 1–3 carbons in the alkyl and 1–6 carbons in the alkoxy group.

---

The present application is a continuation-in-part of United States Ser. No. 496,167, filed Oct. 4, 1965, now abandoned.

The 3-(γ-amino-β-hydroxypropyl)-4-methyl-7-hydroxycoumarin derivatives of the present invention are obtained by reacting 3-(γ-amino-β-hydroxypropyl)-4-methyl-7-hydroxy-coumarins having the general formula

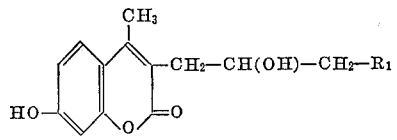

with compounds that are suitable for the introduction of the above designated residue $R_2$ in particular halogeno compounds of the formula $R_2 \cdot Hal$, optionally in the presence of an acid-binding agent. The examples which follow illustrate specific methods of carrying out the reaction.

The 3-(γ-amino-2-hydroxypropyl)-4-methyl-7-hydroxy-coumarin derivatives of the present invention possess excellent vasodilatory action, in particular on the coronary vessels. In this respect, they are superior to the natural products papaverine and khelline.

To show the pharmacological superiority of the compounds under the present invention as compared with the 2,6 - di - (diethanolamino) - 4,8 - dipiperidino-pyrimido(5,4 - d)pyrimidine ("dipyridamole"), well known as a commercial product having a good coronary vasodilatory action from "Arzneimittelforschung 9, 39 to 45 (1959), comparative tests with respect to the vasodilatory action were carried out in dogs according to the method disclosed by Eckenhoff, Hafkenschiel, and Landmesser in the American Journal of Physiology, 148 (1947) p. 582. The test preparations including known controls were injected intravenously into the narcotized animals. The coronary blood flow was measured by means of an automatic Bubble-Flow-Meter and the blood pressure was measured by means of an Anderson-Glass-Capsule Manometer. During the test period the animals were given artificial respiration. Under these test conditions the dilatation of the coronary artery, caused by the test substance, gives rise to a more rapid bubble flow, whereas a constriction of the coronary vessels becomes evident from a retardation of the bubble flow, which is recorded by a kymograph.

As a comparative substance "dipyridamole" was similarly used in a standard dosage of 0.2 mg./kg. As can be seen from the report by Kadatz in "Arzneimittelforschung" 9, 40 (1939), dosages higher than 0.2 mg./kg. of the

| Substance | Toxicity (LD$_{50}$), i.v. mouse | Dosage, mg./kg., i.v. | Maximum increase in the coronary flow in percent | Duration of the action in minutes | Decrease in the mean blood pressure in mm. Hg. | Duration of the action in minutes |
|---|---|---|---|---|---|---|
| 3-(γ-piperidino-β-hydroxypropyl)-4-methyl-7-ethoxy-carbonylmethoxy-coumarin | 0.145 | 1.0 | 65 | 45 | −5 | 45 |
| 3-(γ-piperidino-β-hydroxypropyl)-4-methyl-7-hexyloxy-carbonylmethoxy-coumarin | 0.022 | 2.0 | 144 | 50 | −20 | 50 |
| 3-(γ-piperidino-β-hydroxypropyl)-4-methyl-7-(γ-ethoxy-carbonylpropoxy)-coumarin | | 2.0 | 65 | 45 | +5 | >45 |
| 3-(γ-diethylamino-β-hydroxypropyl)-4-methyl-7-ethoxy-carbonylmethoxy-coumarin | 0.12 | 2.0 | 118 | 65 | −5 | 60 |
| 3-(γ-diethylamino-β-hydroxypropyl)-4-methyl-7-isobutoxy-carbonylmethoxy-coumarin | 0.45 | 2.0 | 63 | 40 | +13 | 40 |
| 3-(γ-isopropylamino-β-hydroxypropyl-4-methyl-7-ethoxycarbonyl-methoxy-coumarin | 0.18 | 1.0 / 2.0 | 90 / 124 | 70 / 90 | −10 / −20 | 70 / 90 |
| 3-[γ-(2'-butylamino)-β-hydroxypropyl]-4-methyl-7-ethoxycarbonylmethoxy-coumarin | 0.1 | 2.0 | 104 | 45 | −10 | 45 |
| 3-(γ-hexylamino-β-hydroxypropyl)-4-methyl-7-ethoxy-carbonylmethoxy-coumarin | | 2.0 | 37 | 5 | −74 | >30 |
| 3-(γ-cyclohexylamino-β-hydroxypropyl)-4-methyl-7-ethoxycarbonylmethoxy-coumarin | 0.044 | 1.0 | 55 | 70 | −10 | 40 |
| 3-(γ-morpholino-β-hydroxypropyl)-4-methyl-7-isobutoxy-carbonylmethoxy-coumarin | 0.16 | 2.0 | 100 | 40 | −3 | 2 |
| 3-(γ-piperidino-β-hydroxypropyl)-4-methyl-7-methoxy-carbonylmethoxy-coumarin | 0.13 | 2.0 | 67 | >65 | −16 | 40 |
| 3-(γ-dipropylamino-β-hydroxypropyl)-4-methyl-7-ethoxy-carbonylmethoxy-coumarin | 0.078 | 2.0 | 97 | 70 | +8 | 60 |
| 3-(γ-dimethylamino-β-hydroxypropyl)-4-methyl-7-ethoxy-carbonylmethoxy-coumarin | 0.04 | 2.0 | 25 | 40 | −32 | >40 |
| 3-(γ-dibutylamino-β-hydroxypropyl)-4-methyl-7-ethoxy-carbonylmethoxy-coumarin | 0.032 | 2.0 | 32 | 40 | −14 | >40 |
| Comparative substance: dipyridamole | 0.15 | 0.2 | 59 | 50 | −15 | 50 |

The above results show that the novel derivatives of the 3-(γ-amino-β-hydroxypropyl)-4-methyl-7-hydroxy-coumarin produce either a greater or a more prolonged coronary dilatation with the same effect on the blood pressure or cause a lower effect on the blood pressure with the same coronary action, as compared to the comparative compound dipyridamole.

"dipyridamole" lower the arterial blood pressure to such an extent that the effect of the coronary dilatation may be eliminated or even converted into a decrease in the blood flow. The maximum increase of 59% in the coronary flow, caused by 0.2 mg./kg. "dipyridamole," thus represents the optimum coronary dilation that may be achieved with this substance.

The table above shows the results obtained as above described using representative examples of the claimed 3 - ($\gamma$ - amino - $\beta$ - hydroxypropyl)-4-methyl-7-hydroxy- Other 3 - ($\gamma$-amino - $\beta$ - hydroxypropyl)-4-methyl-7-hydroxy-coumarin derivatives having the formula

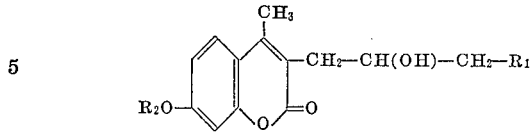

were similarly prepared in which $R_1$ and $R_2$ of the above formula were represented by the following radicals:

| $R_1$ | $R_2$ | Melting point of the hydrochloride |
|---|---|---|
| —HN·CH(CH$_3$)$_2$ | —CH$_2$·COOC$_2$H$_5$ | 110–112° |
| —HN·CH(CH$_3$)C$_2$H$_5$ | —CH$_2$·COOC$_2$H$_5$ | [1] 85° |
| —HN·CH$_2$·CH(CH$_3$)$_2$ | —CH$_2$·COOC$_2$H$_5$ | 161° |
| —HN·CH$_2$·CH$_2$·CH$_2$·OCH$_3$ | —CH$_2$·COOC$_2$H$_5$ | 179° |
| —HN·CH$_2$·CH=CH$_2$ | —CH$_2$·COOC$_2$H$_5$ | 183° |
| —NH—⟨H⟩ (cyclohexyl) | —CH$_2$·COOC$_2$H$_5$ | 197° |
| —N⟨H⟩ (piperidino) | —CH$_2$·COOC$_2$H$_5$ | 122° |
| —N⟨H O⟩ (morpholino) | —CH$_2$·COOC$_2$H$_5$ | [1] 70° |
| —N⟨H⟩ (piperidino) | —CH$_2$·COOC$_6$H$_{13}$ | 112° |
| —N⟨H O⟩ (morpholino) | —CH$_2$·COO·CH$_2$·CH(CH$_3$)$_2$ | 177–179° |
| —N·(C$_2$H$_5$)$_2$ | —CH$_2$·COO·CH$_2$CH(CH$_3$)$_2$ | [2] 74–76° |
| NHC$_6$H$_{13}$ | —CH$_2$·COOC$_2$H$_5$ | 189° |
| —N⟨H⟩ (piperidino) | —CH$_2$·CH$_2$·CH$_2$·COOC$_2$H$_5$ | [2] 92–94° |
| —N⟨H⟩ (piperidino) | —CH$_2$COOCH$_3$ | [1] 60° |
| —N(C$_3$H$_7$)$_2$ | —CH$_2$COOC$_2$H$_5$ | [1] 50° |
| —N(CH$_3$)$_2$ | —CH$_2$COOC$_2$H$_5$ | [1] 70° |
| —N(C$_4$H$_9$)$_2$ | —CH$_2$COOC$_2$H$_5$ | 91–93° |
| —NH—CH$_2$CH$_2$CH$_2$—O—CH$_2$—CH(CH$_3$)$_2$ | —CH$_2$COOC$_2$H$_5$ | 157° |

[1] Decomposition.
[2] Free base.

coumarin derivatives, similar results being obtained with other derivatives not included in the table.

The following example will further illstrate how our invention may be carried out in practice, but the inven- is not restricted to the example. All temperatures are degrees centigrade.

EXAMPLE 19.5 g. 3-($\gamma$-diethylamino-$\beta$-hydroxypropyl)-4-methyl-7-hydroxy-coumarin hydrochloride and 18 g. calcined potassium carbonate were stirred in 160 cc. dimethyl formamide at 70° for 2 hours. Then, while stirring, at 70° 9 g. ethyl chloroacetate were allowed to slowly drip in. Stirring was then continued for 7 hours at 70°. The reaction mixture was then filtered off with suction and the filtrate evaporated to dryness in the vacuum. For further purification, the remaining raw product was dissolved in ethyl acetate and washed with diluted sodium hydroxide solution. By introducing hydrochloric acid gas into the dried ethyl acetate solution the reaction product was precipitated in the form of its hydrochloride. Yield: 13 g. (53.3% of the theoretical) 3-($\gamma$-diethylamino-$\beta$-hydroxypropyl) - 4 - methyl-7-ethoxycarbonylmethoxy-coumarin hydrochloride) having a melting point of 117°.

The following are representative 3-($\gamma$-amino-$\beta$-hydroxypropyl)-4-methyl-7-hydroxy-coumarin derivatives of the type covered by the above structural formula which have been found to possess excellent vasodilatory action, particularly on the coronary vessels:

3-($\gamma$-piperidino-$\beta$-hydroxypropyl)-4-methyl-7-ethoxycarbonyl-methoxy-coumarin;
3-($\gamma$-piperidino-$\beta$-hydroxypropyl)-4-methyl-7-hexyloxycarbonyl-methoxy-coumarin;
3-($\gamma$-piperidino-$\beta$-hydroxypropyl)-4-methyl-7-($\gamma$-ethoxycarbonyl-propoxy)-coumarin;
3($\gamma$-diethylamino-$\beta$-hydroxypropyl)-4-methyl-7-ethoxycarbonyl-methoxy-coumarin;
3-($\gamma$-diethylamino-$\beta$-hydroxypropyl)-4-methyl-7-isobutoxycarbonyl-methoxy-coumarin;
3-($\gamma$-isopropylamino-$\beta$-hydroxypropyl)-4-methyl-7-ethoxycarbonyl-methoxy-coumarin;
3-[$\gamma$-(2'butylamino)-$\beta$-hydroxypropyl]-4-methoxy-7-ethoxycarbonyl-methoxy-coumarin;
3-($\gamma$-hexylamino-$\beta$-hydroxypropyl)-4-methyl-7-ethoxycarbonyl-methoxy-coumarin;
3-($\gamma$-cyclohexylamino-$\beta$-hydroxypropyl)-4-methyl-7-ethoxycarbonyl-methoxy-coumarin;

3-(γ-morpholino-β-hydroxypropyl)-4-methyl-7-isobutoxy-carbonyl-methoxy-coumarin;

3-(γ-piperidino-β-hydroxypropyl)-4-methyl-7-methoxy-carbonyl-methoxy-coumarin;

3-(γ-dipropylamino-β-hydroxypropyl)-4-methyl-7-ethoxycarbonyl-methoxy-coumarin;

3-(γ-dimethylamino-β-hydroxypropyl-4-methyl-7-ethoxycarbonyl-methoxy-coumarin;

3-(γ-dibutylamino-β-hydroxypropyl)-4-methyl-7-ethoxycarbonyl-methoxy-coumarin;

We claim:

1. A compound having the structural formula

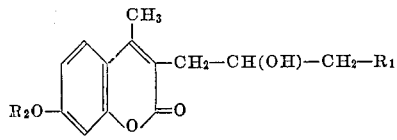

wherein $R_1$ is a member selected from the group consisting of alkylamino radicals having 2–6 carbon atoms, alkoxyalkylamino radicals having 1–4 carbon atoms in the alkoxy and 3–4 carbon atoms in the alkyl group, dialkylamino radicals having 1–4 carbon atoms, allylamino, cyclohexylamino, piperidino and morpholino; and $R_2$ is a member selected from the group consisting of alkoxycarbonyl, alkyl radicals having 1–3 carbons in the alkyl and 1–6 carbons in the alkoxy group or the hydrochloride salt thereof.

2. 3 - (γ - piperidino - β - hydroxypropyl) - 4-methyl-7-ethoxycarbonyl-methoxy-coumarin according to claim 1 or the hydrochloride salt thereof.

3. 3-(γ - diethylamino - β - hydroxypropyl)-4-methyl-7-ethoxycarbonyl-methoxy-coumarin according to claim 1 or the hydrochloride salt thereof.

4. 3 - (γ-isopropylamino-β-hydroxypropyl)-4-methyl-7-ethoxycarbonyl-methoxy-coumarin according to claim 1 or the hydrochloride salt thereof.

5. 3 - (γ-cyclohexylamino-β-hydroxypropyl)-4-methyl-7-ethoxycarbonyl-methoxy-coumarin according to claim 1 or the hydrochloride salt thereof.

6. 3-[γ-(2'-butylamino)-β-hydroxypropyl]-4-methyl-7-ethoxycarbonyl-methoxy-coumarin according to claim 1 or the hydrochloride salt thereof.

No references cited.

ALEX MAZEL, Primary Examiner

JOSE TOVAR, Assistant Examiner

U.S. Cl. X.R.

260—247.2, 343.2; 424—248, 267, 281